(12) United States Patent
Ohara et al.

(10) Patent No.: US 6,633,340 B1
(45) Date of Patent: Oct. 14, 2003

(54) VIDEO SIGNAL PROCESSOR

(75) Inventors: Atsushi Ohara, Kyoto (JP); Takuji Yoneda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 431 days.

(21) Appl. No.: 09/693,902

(22) Filed: Oct. 23, 2000

(30) Foreign Application Priority Data

Sep. 12, 1999 (JP) .......................................... 11-350726

(51) Int. Cl.⁷ ............................ H04N 7/24; H04N 7/00; H04N 9/77; H04N 9/79; H04B 7/00; H03C 3/02; H03L 7/00

(52) U.S. Cl. ...................... 348/536; 348/471; 348/540; 348/689; 348/723; 348/724; 386/22; 455/42

(58) Field of Search ................................ 348/536, 724, 348/723, 540, 689, 470; 386/26, 28, 29; 332/117, 123, 126, 127; 455/42, 75

(56) References Cited

U.S. PATENT DOCUMENTS

| | | | | |
|---|---|---|---|---|
| 4,068,259 A | * | 1/1978 | Tinet et al. | 348/471 |
| 4,287,529 A | * | 9/1981 | Tatami et al. | 386/51 |
| 4,347,619 A | * | 8/1982 | Dakin et al. | 375/259 |
| 4,425,584 A | * | 1/1984 | Hirota et al. | 386/22 |
| 4,786,986 A | * | 11/1988 | Yamanushi et al. | 386/93 |
| 5,282,224 A | * | 1/1994 | Harada | 375/224 |
| 5,504,464 A | * | 4/1996 | Hwang | 332/127 |
| 5,506,547 A | * | 4/1996 | Ishikawa | 332/135 |
| 5,517,159 A | * | 5/1996 | Hwang | 332/127 |
| 5,534,943 A | | 7/1996 | Hwang | |
| 5,546,133 A | * | 8/1996 | Honma | 348/642 |
| 5,905,413 A | * | 5/1999 | Yoshida et al. | 332/100 |
| 6,118,497 A | * | 9/2000 | Pugel | 348/723 |

FOREIGN PATENT DOCUMENTS

| | | | |
|---|---|---|---|
| EP | 1109404 A2 * | 6/2001 | ............ H04N/5/92 |
| JP | 2-125587 | 5/1990 | |
| JP | 10-108137 | 4/1998 | |

* cited by examiner

*Primary Examiner*—John Miller
*Assistant Examiner*—Paulos Natnael
(74) *Attorney, Agent, or Firm*—McDermott, Will & Emery

(57) ABSTRACT

A video signal processor reduces the deterioration of image quality due to the superposition of noise on a sync signal included in a luminance signal. A frequency discriminator outputs a first error signal if a ratio of the frequency of a frequency-modulated signal during a sync-signal interval to the frequency of a reference frequency signal is smaller than a predetermined ratio. Alternatively, the discriminator outputs a second error signal if the ratio is greater than the predetermined ratio. If the first error signal has been input to a frequency controller a preset number of times or more during an interval before the second error signal is input thereto, the controller instructs a frequency modulator to increase the frequency of the frequency-modulated signal. On the other hand, if the second error signal has been input to the controller a preset number of times or more during an interval before the first error signal is input thereto, the controller instructs the modulator to decrease the frequency of the frequency-modulated signal.

5 Claims, 12 Drawing Sheets

VIDEO SIGNAL PROCESSOR

BACKGROUND OF THE INVENTION

The present invention relates to a video signal processor for use in a videotape recorder.

A video signal processor, which includes a frequency modulator with automatic frequency control capabilities and is applicable to a videotape recorder, is disclosed in Japanese Laid-Open Publication No. 10-108137. Hereinafter, a video signal processor of this type will be described.

FIG. 13 illustrates a configuration for the known video signal processor. The luminance component of an input video signal (which will be simply called a "luminance signal") is input to a clamping circuit 11, which clamps a sync tip level of the luminance signal. Then, the luminance signal is pre-emphasized by a preemphasis circuit 12 and clipped by a white clip and dark clip circuit 13. Next, a frequency modulator (which will be herein called an "FM modulator") 14 outputs a frequency-modulated signal (which will be herein called an "FM modulated signal") of the luminance signal.

On the other hand, a sync separator 81 separates only a sync signal from the luminance signal that has had its sync tip level clamped by the clamping circuit 11, and then outputs the sync signal to a pulse generator 82. In an interval other than a vertical blanking interval, the pulse generator 2 generates pulses with a width of 50 μs synchronously with horizontal-sync pulses, i.e., each pulse generated starts at the leading edge of a horizontal-sync signal.

A counter 83 receives not only the pulses, generated by the pulse generator 82, as reset pulses, but also the output signal of the FM modulator 14 as clock pulses. And the counter 83 starts counting the number of clock pulses on the leading edge of the horizontal-sync signal. A value "9" is set for the counter 83. That is to say, when the count of the counter 83 reaches this value, the counter 83 informs another pulse generator 84 of that. Accordingly, the pulse generator 84 generates pulses with a width nine times longer than the period of the FM modulated signal that has been output from the FM modulator 14.

A crystal oscillator (which will be herein called a "VXO") 85 outputs a signal to a counter 86 at a frequency twice higher than a sub-carrier frequency fsc. The counter 86 receives not only the pulses, generated by the pulse generator 84, as reset pulses, but also the output pulses of the VXO 85 as clock pulses. And the counter 86 outputs the count of the input clock pulses to a decoder 87. The decoder 87 compares a predefined value, which was determined in accordance with the type of the video signal or the method of recording, to the output value of the counter 86 and then outputs a signal representing the equality or inequality of these values.

An error signal generator 88 outputs one of the following two types of error signals to an integrator 50 in accordance with the output of the decoder 87. Specifically, if the output of the counter 86 is greater than the predefined value of the decoder 87, then the error signal generator 88 outputs an error signal of the type increasing the frequency of the FM modulated signal output from the FM modulator 14. Conversely, if the output of the counter 86 is smaller than the predefined value of the decoder 87, then the error signal generator 88 outputs an error signal of the type decreasing the frequency of the FM modulated signal output from the FM modulator 14. In response, the integrator 50 integrates the error signal received and then outputs an integrated error signal ei to the FM modulator 14, which controls the frequency of the FM modulated signal in response to the integrated error signal ei.

FIG. 2 illustrates a configuration for the integrator 50 shown in FIG. 13. A potential at the positive electrode of a capacitor 55 is output as the integrated error signal ei to the FM modulator 14, thereby controlling the frequency of the FM modulated signal. If the error signal generator 88 outputs the error signal of the type increasing the frequency of the FM modulated signal, then a switch 51 turns ON and a current source 53 charges the capacitor 55. As a result, a potential at the output terminal rises and the frequency of the FM modulated signal increases. Alternatively, if the error signal generator 88 outputs the error signal of the type decreasing the frequency of the FM modulated signal, then a switch 52 turns ON and a current source 54 discharges the capacitor 55. As a result, a potential at the output terminal falls and the frequency of the FM modulated signal decreases.

However, the integrator 50 shown in FIG. 2 analogically integrates the error signal, output from the error signal generator 88, using the capacitor 55. Accordingly, if extraneous noise has instantaneously entered a horizontal-sync signal for the luminance signal, for example, then the error signal generator 88 will output the error signal and the potential of the integrated error signal ei will change. As a result, the frequency of the FM modulated signal may change, too. In that case, while video is reproduced (i.e., after the modulated signal has been demodulated), the clamping circuit might operate erroneously to generate horizontal striped noise on the screen. To avoid such an unfavorable situation, the capacitance value of the capacitor 55 is increased or the current value of the current sources 53 and 54 is decreased according to the prior art. Such a technique, however, adversely delays the response of the frequency control. In addition, it is impossible to eliminate the potential variation of the integrated error signal ei due to the extraneous noise.

SUMMARY OF THE INVENTION

It is therefore an object of the present invention to provide a video signal processor that can reduce the deterioration of image quality resulting from the superposition of extraneous noise on a sync signal of a luminance signal.

An inventive video signal processor includes frequency modulator, frequency discriminator and frequency controller. The frequency modulator outputs-a frequency-modulated signal of a luminance signal input thereto. The frequency discriminator receives a reference frequency signal and the frequency-modulated signal and outputs a first or second error signal every horizontal or vertical scanning interval. Specifically, if a ratio of a frequency of the frequency-modulated signal during a horizontal- or vertical-sync signal interval to a frequency of the reference frequency signal is smaller than a predetermined ratio, the discriminator outputs the first error signal. Alternatively, if the ratio is greater than the predetermined ratio, the discriminator outputs the second error signal. The frequency controller outputs, responsive to the first and second error signals, a control signal to the frequency modulator. Specifically, if the first error signal has been input to the controller a preset number of times or more during an interval before the second error signal is input thereto, the controller instructs the modulator to increase the frequency of the frequency-modulated signal. Alternatively, if the second error signal has been input to the controller a preset number of times or more during an interval before the first error signal is input thereto, the controller instructs the modulator to decrease the frequency of the frequency-modulated signal.

The inventive processor controls and instructs the frequency modulator to change the frequency of the frequency-modulated signal only if the frequency discriminator has output one of the two types of error signals a preset number of times or more before the discriminator outputs the other type of error signal. Accordingly, the frequency of the frequency-modulated signal can be controlled at a target value with the effects of random noise lessened sufficiently.

In one embodiment of the present invention, the frequency controller may include first and second counters, first and second switches and integrator. The first counter receives the first and second error signals at its clock and reset terminals, respectively, and counts the number of times the first error signal has been input thereto. The first counter outputs a first matching signal when the counted number reaches a first preset number of times. The second counter receives the first and second error signals at its reset and clock terminals, respectively, and counts the number of times the second error signal has been input thereto. The second counter outputs a second matching signal when the counted number reaches a second preset number of times. The first switch passes the first error signal while the first counter is outputting the first matching signal. On the other hand, the second switch passes the second error signal while the second counter is outputting the second matching signal. The integrator receives and integrates the first and second error signals, which have been passed through the first and second switches, respectively, as two inputs of mutually opposite polarities, thereby outputting a result of the integration. The frequency controller provides the output of the integrator as the control signal to the frequency modulator.

In such an embodiment, no error signals are propagated to the integrator unless the frequency discriminator has output one of the two types of error signals the first or second preset number of times or more, which is set for the first or second counter, before the discriminator outputs the other type of error signal. Thus, the frequency modulator is much less likely to change the frequency of the frequency-modulated signal due to the random noise.

In an alternate embodiment, the first and second error signals may be supplied as pulses and the frequency controller may include first and second frequency dividers, first, second, third and fourth switches and integrator. The first frequency divider counts the number of times a signal has been input thereto as the pulses and outputs a first matching signal when the counted number reaches a first preset number of times. The second frequency divider counts the number of times a signal has been input thereto as the pulses and outputs a second matching signal when the counted number reaches a second preset number of times. The first switch passes the first error signal while the first frequency divider is outputting the first matching signal. The second switch passes the second error signal while the second frequency divider is outputting the second matching signal. The integrator receives and integrates the first and second error signals, which have been passed through the first and second switches, respectively, as two inputs of mutually opposite polarities, thereby outputting a result of the integration. The third switch passes the first error signal to the first and second frequency dividers as the input and reset signals, respectively, while the first frequency divider is not outputting the first matching signal. And the fourth switch passes the second error signal to the first and second frequency dividers as the reset and input signals, respectively, while the second frequency divider is not outputting the second matching signal. The frequency controller provides the output of the integrator as the control signal to the frequency modulator.

In such an embodiment, no error signals are propagated to the integrator unless the frequency discriminator has output the pulses of one of the two types of error signals the first or second preset number of times or more, which is set by the construction of the first or second frequency divider, before the discriminator outputs the other type of error signal. Thus, the frequency modulator is much less likely to change the frequency of the frequency-modulated signal due to the random noise.

In yet another embodiment, the processor may further include a sync signal waveform shaping circuit for making a signal level of a component of the luminance signal, which is equal to or lower than a threshold value, constant and outputting a waveform-shaped version of the luminance signal. The frequency modulator outputs a frequency-modulated signal of the waveform-shaped luminance signal input thereto.

In such an embodiment, if noise with a voltage equal to or lower than the threshold value has been superposed on a horizontal- or vertical-sync signal, the processor is not affected by the noise. Also, even if noise with a voltage exceeding the threshold value has been superposed, the adverse effects thereof can be lessened sufficiently and the frequency of the frequency-modulated signal is controllable so long as the noise is superposed at random.

Another inventive video signal processor includes sync signal waveform shaping circuit, frequency modulator, frequency discriminator and frequency controller. The sync signal waveform shaping circuit makes a signal level of a component of a luminance signal, which is equal to or lower than a threshold value, constant and outputs a waveform-shaped version of the luminance signal. The frequency modulator outputs a frequency-modulated signal of the waveform-shaped luminance signal input thereto. The frequency discriminator receives a reference frequency signal and the frequency-modulated signal and outputs a first or second error signal every horizontal or vertical scanning interval. The discriminator outputs the first error signal if a ratio of a frequency of the frequency-modulated signal during a horizontal- or vertical-sync signal interval to a frequency of the reference frequency signal is smaller than a predetermined ratio. The discriminator outputs the second error signal if the ratio is greater than the predetermined ratio. The frequency controller outputs a control signal to the frequency modulator responsive to the first and second error signals.

The inventive video signal processor can control the frequency of the frequency-modulated signal even if noise with a voltage equal to or lower than the threshold value has been superposed on a horizontal- or vertical-sync signal.

DESCRIPTION OF THE PREFERRED EMBODIMENTS

Hereinafter, preferred embodiments of the present invention will be described with reference to the accompanying drawings.

EMBODIMENT 1

Figure 1:
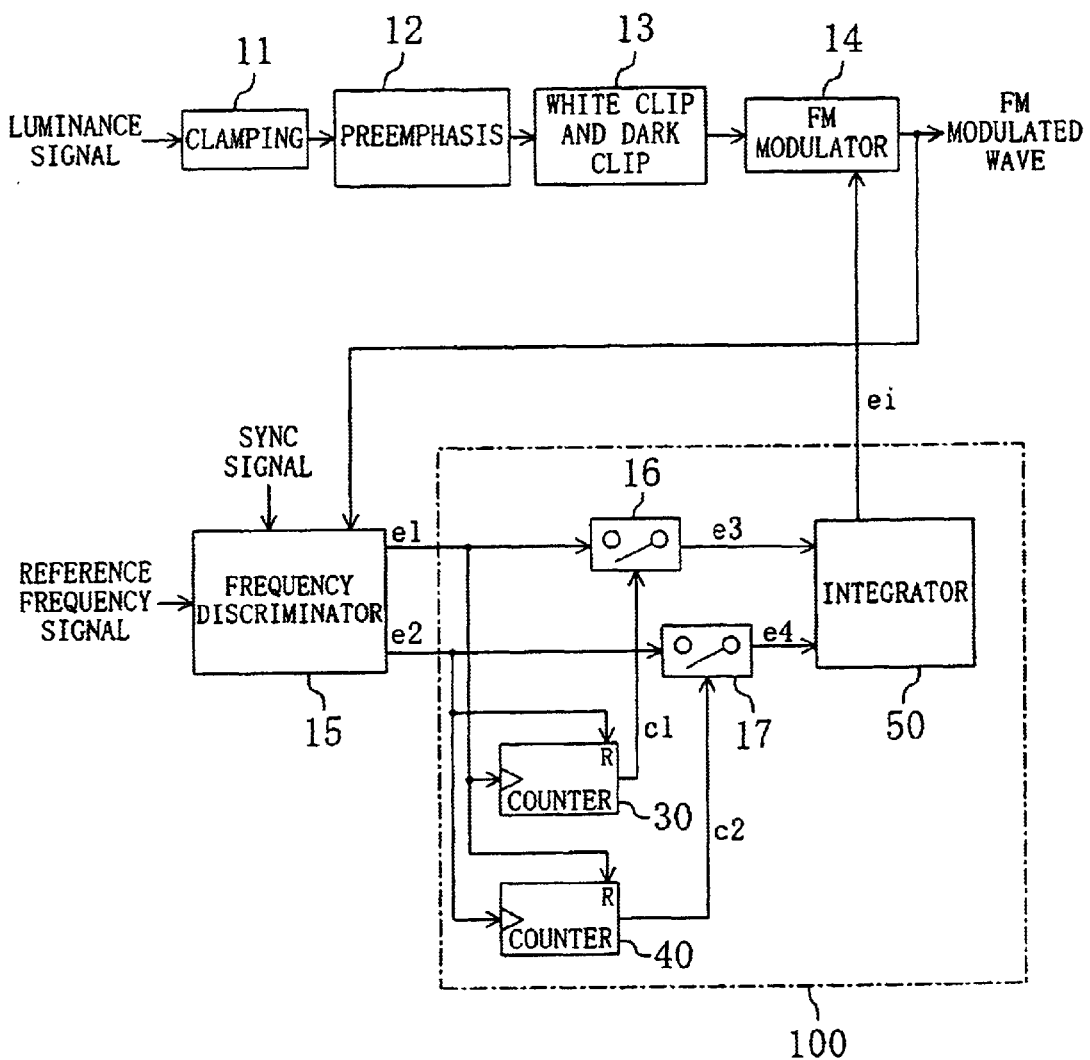
FIG. 1 is a block diagram illustrating a configuration for a video signal processor according to a first embodiment f the present invention.

FIG. 1 illustrates a configuration for a video signal processor according to a first embodiment of the present invention. As shown in FIG. 1, the processor includes clamping circuit 11, preemphasis circuit 12, white clip and dark clip circuit 13, FM modulator 14, frequency discriminator 15, first and second switches 16 and 17, first and second counters 30 and 40 and integrator 50.

In the illustrated embodiment, the first and second switches 16 and 17, first and second counters 30 and 40 and integrator 50 together functions as a frequency controller 100. In the following description, a "sync signal" will be either horizontal- or vertical-sync signal.

The luminance component of an input video signal, or a luminance signal including a sync signal, is input to the clamping circuit 11, which clamps a sync tip level of the luminance signal and outputs the clamped signal to the preemphasis circuit 12. The preemphasis circuit 12 preemphasizes the luminance signal and outputs the pre-emphasized signal to the white clip and dark clip circuit 13, which in turn does clipping on the input signal and outputs the clipped signal to the FM modulator 14. The FM modulator 14 receives the luminance signal processed in this manner and outputs its FM modulated signal. The FM modulator 14 also controls the frequency fo of the FM modulated signal in accordance with the output of the integrator 50.

The FM modulated signal and a signal with a reference frequency (which will be herein called a "reference frequency signal") are input to the frequency discriminator 15. The luminance signal at any stage between the output of the clamping circuit 11 and the input of the FM modulator 14 is also input as a sync signal to the frequency discriminator 15. That is to say, the sync signal may be the output of the clamping circuit 11, preemphasis circuit 12 or white clip and dark clip circuit 13, for example. A target frequency of the output signal of the FM modulator 14 in an interval during which a horizontal-sync signal is logically high (which will be herein called a "horizontal-sync signal interval") will be called a "prescribed frequency". That is to say, the prescribed frequency is the target frequency of the carrier signal and corresponds to the sync tip level.

In a horizontal-sync signal interval, the frequency discriminator 15 compares a first ratio (i.e., a ratio of the frequency fo of the FM modulated signal to that of the reference frequency signal) to second a ratio (i.e., a ratio of the prescribed frequency to the frequency of the reference frequency signal). If the first ratio is smaller than the second ratio (i.e., a prescribed ratio), i.e., if the frequency fo of the FM modulated signal is lower than the prescribed frequency, then the frequency discriminator 15 outputs a first error signal e1 to the first switch 16 to increase the frequency fo of the FM modulated signal. The frequency discriminator 15 also outputs the first error signal e1 to the first and second counters 30 and 40 as clock and reset pulses, respectively.

Alternatively, if the first ratio is greater than the second ratio, i.e., if the frequency fo of the FM modulated signal is higher than the prescribed frequency, then the frequency discriminator 15 outputs a second error signal e2 to the second switch 17 to decrease the frequency fo of the FM modulated signal. The frequency discriminator 15 also outputs the second error signal e2 to the first and second counters 30 and 40 as reset and clock pulses, respectively. Each of the error signals e1 and e2 may be applied as positive pulses, whose signal level reaches a high potential level (i.e., "H level") just once during a horizontal scanning interval, in which the frequency discriminator 15 compares the frequencies.

The first counter 30 counts the number of pulses of the first error signal e1 that has been input as clock pulses. When the count reaches a first prescribed value, the first counter 30 raises the level of its output signal c1 (i.e., the first matching signal as defined in the claims) to H. On the other hand, on receiving each pulse of the second error signal e2, the first counter 30 resets its count and lowers the level of its output signal c1 to a low potential level (which will be herein called an "L level"). The first counter 30 provides the output signal c1 as a control signal for the first switch 16.

The second counter 40 counts the number of pulses of the second error signal e2 that has been input as clock pulses. When the count reaches a second prescribed value, the second counter 40 raises the level of its output signal c2 (i.e., the second matching signal as defined in the claims) to H. On the other hand, on receiving each pulse of the first error signal e1, the second counter 40 resets its count and lowers the level of its output signal c2 to L. The second counter 40 provides the output signal c2 as a control signal for the second switch 17.

That is to say, if only the pulses of the first error signal e1 have been input a preset number of times or more in an interval between a time the first counter 30 is reset when the processor is powered and a time a pulse of the second error signal e2 is applied or between a time a pulse of the second error signal e2 is applied and a time another pulse thereof is applied, then the first counter 30 raises the level of its output signal c1 to H. In the same way, if only the pulses of the second error signal e2 have been input a preset number of times or more in an interval between a time the second counter 40 is reset when the processor is powered and a time a pulse of the first error signal e1 is applied or between a time a pulse of the first error signal e1 is applied and a time another pulse thereof is applied, then the second counter 40 raises the level of its output signal c2 to H.

The first switch 16 turns ON only when the output signal c1 of the first counter 30 is H. In the ON state, the first switch 16 passes the first error signal e1 received and outputs it as it is (i.e., as the error signal e3) to the intergrator 50. On the other hand, the second switch 17 turns ON only when the output signal c2 of the second counter 40 is H. In the ON state, the second switch 17 passes the second error signal e2 received and outputs it as it is (i.e., as the error signal e4) to the integrator 50.

The integrator 50 performs integration on the third and fourth error signals e3 and e4 received at its non-inverting and inverting input terminals, respectively, and then outputs the result of the integration as an integrated error signal ei to the FM modulator 14. Specifically, when the signal received at the non-inverting input terminal rises to the H level, the integrator 50 raises the potential level of the integrated error signal ei. Conversely, when the signal received at the inverting input terminal rises to the H level, the integrator 50 lowers the potential level of the integrated error signal ei.

The FM modulator 14 controls the frequency fo of the FM modulated signal in accordance with the integrated error signal ei. That is to say, if the potential level of the integrated error signal ei is relatively high, then the FM modulator 14 increases the frequency fo of the FM modulated signal. Alternatively, if the potential level of the integrated error signal ei is relatively low, then the FM modulator 14 decreases the frequency fo of the FM modulated signal. Accordingly, the FM modulator 14 controls and matches the frequency fo of the FM modulated signal during a horizontal-sync signal interval to the prescribed frequency.

Figure 2:
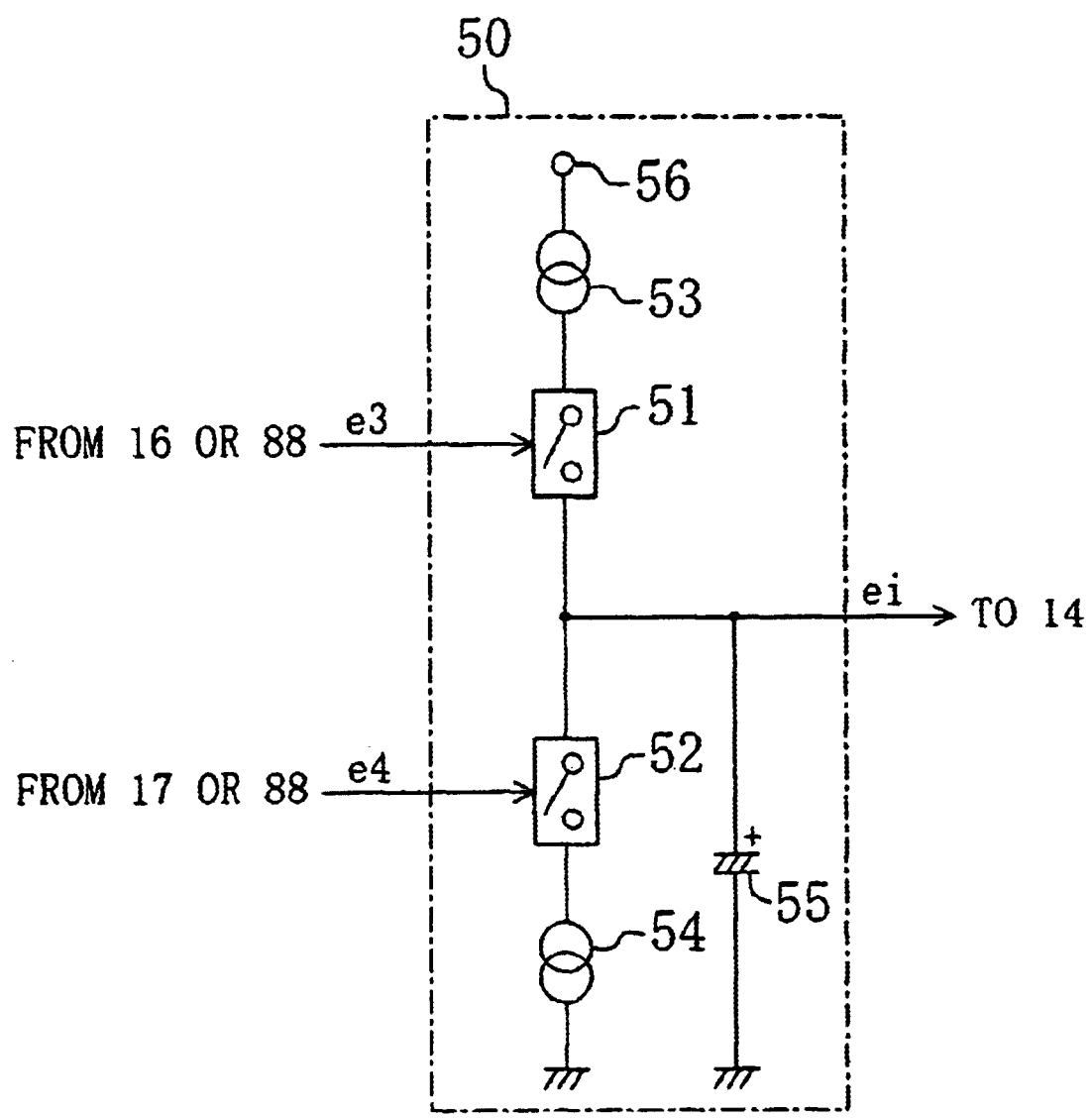
FIG. 2 is a circuit diagram illustrating a configuration for the integrator shown in FIG. 1.

FIG. 2 illustrates a configuration for the integrator 50 shown in FIG. 1. As shown in FIG. 2, the integrator 50 includes switches 51, 52, current sources 53, 54, capacitor 55 and power supply terminal 56.

Each of the switches 51 and 52 has one of its two terminals connected to the positive electrode of the capacitor 55. The current source 53 is connected between the other terminal of the switch 51 and the power supply terminal 56, while the current source 54 is connected between the other terminal of the switch 52 and a ground line. The power supply terminal 56 is connected to a power supply and the negative electrode of the capacitor 55 is connected to the ground line. The switches 51 and 52 receive the error signals e3 and e4 as their respective control inputs. A potential at the positive electrode of the capacitor 55 is output as the integrated error signal ei to the FM modulator 14.

Only while the error signal e3 is at the H level, the switch 51 turns ON and the current source 53 supplies current to the capacitor 55 by way of the switch 51. As a result, the capacitor 55 is charged and the potential level at its positive electrode rises. On the other hand, only while the error signal e4 is at the H level, the switch 52 turns ON and the current source 54 drains current from the capacitor 55 by way of the switch 52. As a result, the capacitor 55 is discharged and the potential level at its positive electrode drops.

Figure 3:
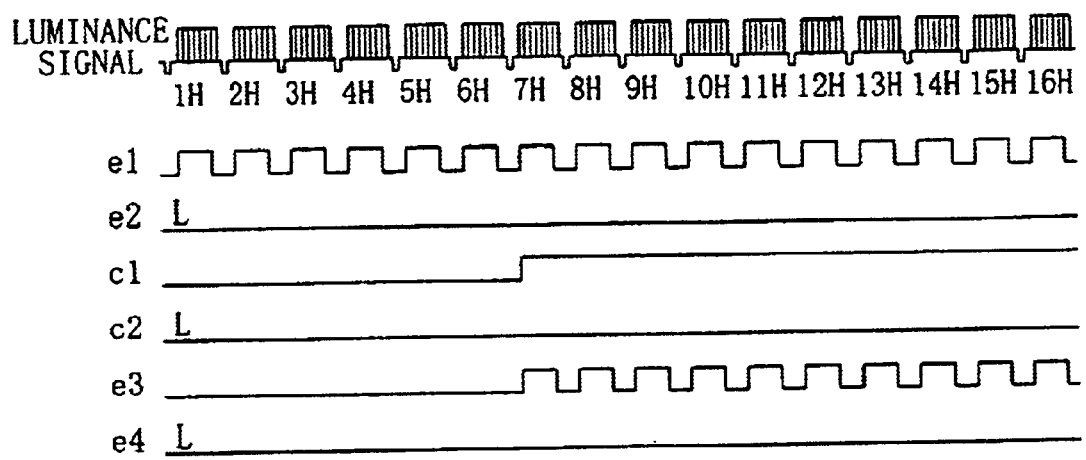
FIG. 3 illustrates signal waveforms at respective parts of the video signal processor shown in FIG. 1 in a situation where the frequency of an FM modulated signal during each horizontal-sync signal interval is lower than a prescribed frequency.
Figure 4:
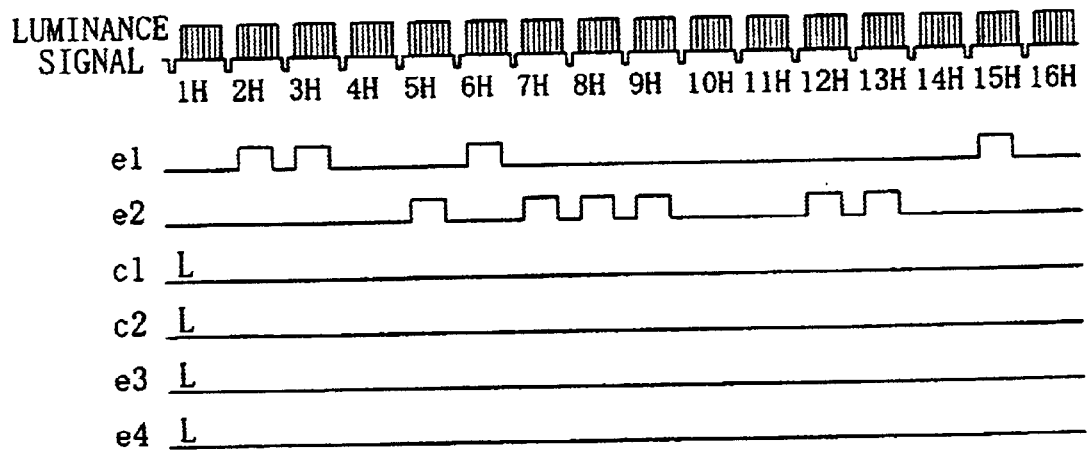
FIG. 4 illustrates signal waveforms at the respective parts of the video signal processor shown in FIG. 1 in a situation where noise is superposed on a luminance signal.

FIG. 3 illustrates signal waveforms at respective parts of the video signal processor shown in FIG. 1 in a situation where the frequency fo of an FM modulated signal during each horizontal-sync signal interval is lower than the prescribed frequency. FIG. 4 illustrates signal waveforms at those parts in a situation where noise is superposed on a luminance signal. In the following description, nH (where n is a natural number) represents an nth horizontal scanning interval and L refers to the low signal level "L" in FIGS. 3 and 4. A horizontal scanning interval covers a period of time between a point in time a horizontal-sync signal interval starts and a point in time the next horizontal-sync signal interval starts. In a video signal interval, any arbitrary luminance signal may be input.

Hereinafter, it will be described how the video signal processor shown in FIG. 1 operates in the situation where the frequency fo of the FM modulated signal during each horizontal-sync signal interval is lower than the prescribed frequency. Suppose the count preset for the first and second counters 30 and 40 shown in FIG. 1 is seven and these counters 30 and 40 are now in their initial state where their counts are both zero and their output signals c1 and c2 are both at the L level at this time.

In the horizontal-sync signal interval during the first horizontal scanning interval 1H shown in FIG. 3, the frequency discriminator 15 finds the frequency fo of the FM modulated signal lower than the prescribed frequency. So the frequency discriminator 15 outputs the first error signal e1 as a clock pulse to the first counter 30 to increase the frequency fo of the FM modulated signal.

In the next six horizontal scanning intervals 2H through 7H, the frequency discriminator 15 repeatedly outputs pulses of the error signal e1 to the first counter 30, which counts the number of pulses of the error signal e1 one by one. And when the count reaches seven, i.e., when the count gets equal to the preset value, the first counter 30 raises its output signal c1 to the H level as shown in FIG. 3, thereby turning the first switch 16 ON. Then, the error signal e1 starts being input as the error signal e3 to the integrator 50. As a result, the potential level of the integrated error signal ei rises and the FM modulator 14 increases the frequency fo of the FM modulated signal. Also, until the error signal e2, which will be input as a reset pulse to the first counter 30, rises to the H level, the first counter 30 will hold its output signal c1 at the H level.

Although not shown, if the potential level of the integrated error signal ei and the frequency fo of the FM modulated signal both go on rising, the frequency discriminator 15 will soon find that the frequency fo of the FM modulated signal is no different from the prescribed frequency. Then, the frequency discriminator 15 stops outputting the error signal e1 as pulses. That is to say, since the error signal e3 will not be input to the integrator 50 after that, the integrated error signal ei will settle to a constant value and the frequency modulator 14 will stop controlling the frequency fo of the FM modulated signal. As a result, the control will enter an equilibrium state.

In the same way, if the frequency discriminator 15 finds the frequency fo of the FM modulated signal higher than the prescribed frequency, the discriminator 15 outputs the error signal e2 as clock pulses to the second counter 40 to decrease the frequency fo of the FM modulated signal. When the count reaches seven, i.e., when the count gets equal to the preset value, the second counter 40 raises its output signal c2 to the H level, thereby turning the second switch 17 ON. Then, the error signal e2 starts being input as the error signal e4 to the integrator 50. As a result, the potential level of the integrated error signal ei drops and the FM modulator 14 decreases the frequency fo of the FM modulated signal. Also, until the error signal e1, which will be input as a reset pulse to the second counter 40, rises to the H level, the second counter 40 will hold its output signal c2 at the H level.

If the potential level of the integrated error signal ei and the frequency fo of the FM modulated signal both go on falling, the frequency discriminator 15 will soon find that the frequency fo of the FM modulated signal is no different from the prescribed frequency. Then, the frequency discriminator 15 stops outputting the error signal e2 as pulses. That is to say, since the error signal e4 will not be input to the integrator 50 after that, the integrated error signal ei will settle to a constant value and the frequency modulator 14 will stop controlling the frequency fo of the FM modulated signal. As a result, the control will enter an equilibrium state.

Figure 5:
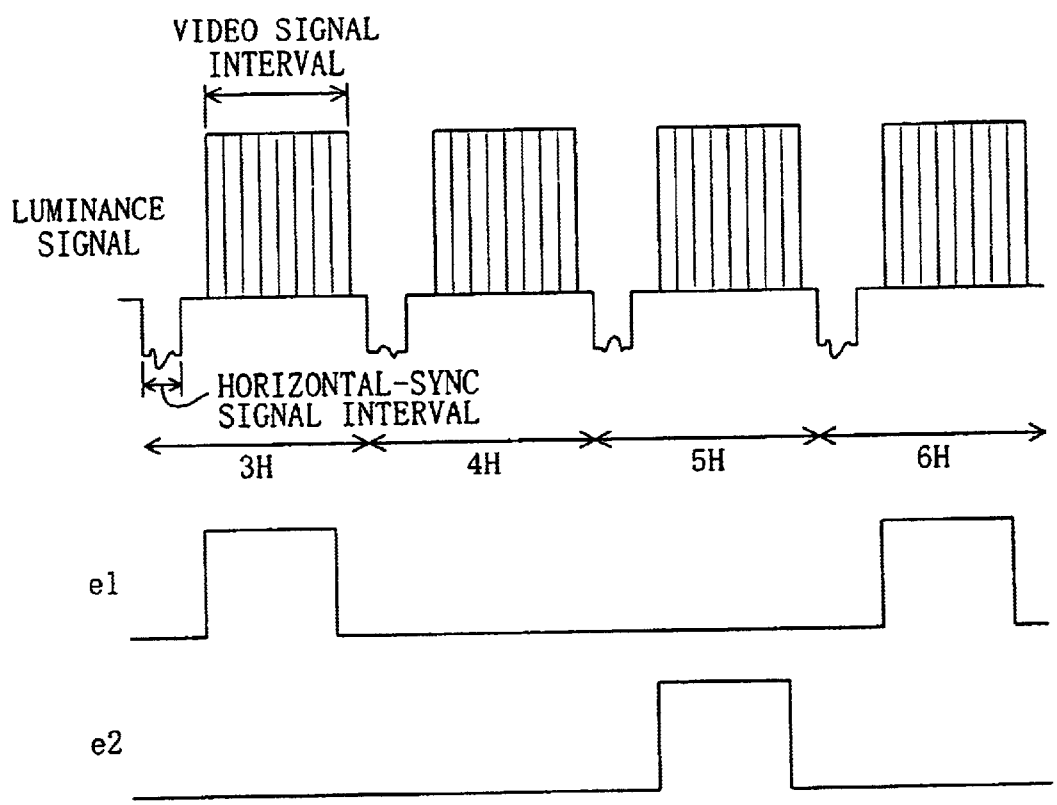
FIG. 5 illustrates in further detail the horizontal scanning intervals 3H through 6H shown in FIG. 4.

Next, it will be described how the video signal processor shown in FIG. 1 operates in the equilibrium state where the frequency fo of the FM modulated signal has not shifted from the prescribed frequency but noise is superposed on a luminance signal. FIG. 5 illustrates in further detail the horizontal scanning intervals 3H through 6H shown in FIG. 4. In FIG. 5, the ratio in length of a horizontal-sync signal interval to a video signal interval is greater than the actual one (i.e., about 7%) to emphasize the noise superposed on the horizontal-sync signal.

As shown in FIG. 5, noise is superposed on the luminance signal. In the horizontal-sync signal interval during the third horizontal scanning interval 3H, the frequency fo of the FM modulated signal is lower than the prescribed frequency due to the noise. Thus, in this horizontal scanning interval 3H, the frequency discriminator 15 outputs the error signal e1 to increase the frequency fo of the FM modulated signal. In the horizontal-sync signal interval during the next horizontal scanning interval 4H, however, noise is not so appreciable and therefore affects the frequency fo of the FM modulated signal to a much lesser degree. Thus, the frequency discriminator 15 outputs no error signals. Then, in the horizontal-sync signal interval during the next horizontal scanning interval 5H, the frequency fo of the FM modulated signal is higher than the prescribed frequency due to the noise. Thus, in this horizontal scanning interval 5H, the frequency discriminator 15 outputs the error signal e2 to decrease the frequency fo of the FM modulated signal.

In this manner, the frequency discriminator 15 outputs the first error signal e1 in the horizontal scanning intervals 2H, 3H, 6H and 15H and the second error signal e2 in the horizontal scanning intervals 5H, 7H, 8H, 9H, 12H and 13H as shown in FIG. 4.

Since pulses of the first error signal e1 are input to the first counter 30 in two consecutive horizontal scanning intervals 2H and 3H, the count of the first counter 30 reaches two. However, since the second error signal e2 is input as a reset pulse to the first counter 30 in the horizontal scanning interval 5H, the count of the first counter 30 is reset to zero.

The second counter 40, on the other hand, increments its count to one in the horizontal scanning interval 5H. But since the first error signal e1 is input as a reset pulse to the second counter 40 in the next horizontal scanning interval 6H, the count of the second counter 40 is also reset to zero.

In the same way, the first counter 30 increases its count to one in the horizontal scanning interval 6H, but is reset to zero in the next horizontal scanning interval 7H. The second counter 40 increases its count from zero to five over the horizontal scanning intervals 7H through 13H, but is reset to zero in the horizontal scanning interval 15H.

Neither the count of the first counter 30 nor that of the second counter 40 reaches the preset value of "7". Thus, both of the output signals c1 and c2 remain at the L level and none of the error signals e3 and e4 is input to the integrator 50. Accordingly, the potential level of the integrated error signal ei does not change and the FM modulator 14 does not control the frequency fo of the FM modulated signal.

Generally speaking, the frequency fo of the FM modulated signal varies at random due to the effects of noise. If noise of the type increasing the frequency fo of the FM modulated signal has been superposed on a luminance signal, the frequency discriminator 15 will output the error signal e1. Even so, the superposition of the opposite type of noise, which decreases the frequency fo of the FM modulated signal, may make the frequency discriminator 15 output the error signal e2 immediately after that. In such a case, the first counter 30 will reset its count. Also, even if the noise, increasing the frequency fo of the FM modulated signal, enters consecutively, the output signal c1 of the first counter 30 will remain L and neither error signal e3 nor e4 will be input to the integrator 50 unless the count reaches the preset value of "7". The same statement is true of the second counter 40. Accordingly, the unwanted effects of the noise can be reduced sufficiently.

If the frequency fo of the FM modulated signal output from the FM modulator 14 has shifted from the prescribed frequency, then the frequency discriminator 15 consecutively detects the frequency shift as being higher or lower than the prescribed frequency, whether noise has been superposed on the luminance signal or not. Thus, the frequency discriminator 15 consecutively outputs the error signal e1 or e2. As a result, the error signal e3 or e4 is input to the integrator 50 and the FM modulator 14 controls and matches the frequency fo of the FM modulated signal during a horizontal-sync signal interval to the prescribed frequency.

In general, the time constant of the integrator 50 is set much longer than the length of a vertical scanning interval (i.e., about 16 to about 20 ms) to reduce the effects of a vertical-synchronization interval. Thus, the length of the interval during which no error signal is propagated to the integrator 50, i.e., the interval (i.e., about 0.4 ms) six times as long as the horizontal scanning interval, or the amount of time taken for the count of the first or second counter 30 or 40 to reach seven, is almost negligible. Accordingly, even if the frequency fo of the FM modulated signal has shifted from the prescribed frequency, the effects of the noise can be lessened without sacrificing the responsiveness of the frequency control.

In the foregoing embodiment, the prescribed count of the first and second counters 30 and 40 is seven. Alternatively, the count may be defined at any other value depending on the noise level and the responsiveness.

Also, a ratio of the prescribed frequency to the frequency of the reference frequency signal may be set to any arbitrary value. And the FM modulator 14 may be controlled to have the frequency fo of the FM modulated signal changed into a prescribed frequency corresponding to this preset ratio.

Hereinafter, a modified example of the first embodiment will be described to illustrate a more specific implementation of the frequency discriminator 15.

Modified Example

Figure 6:
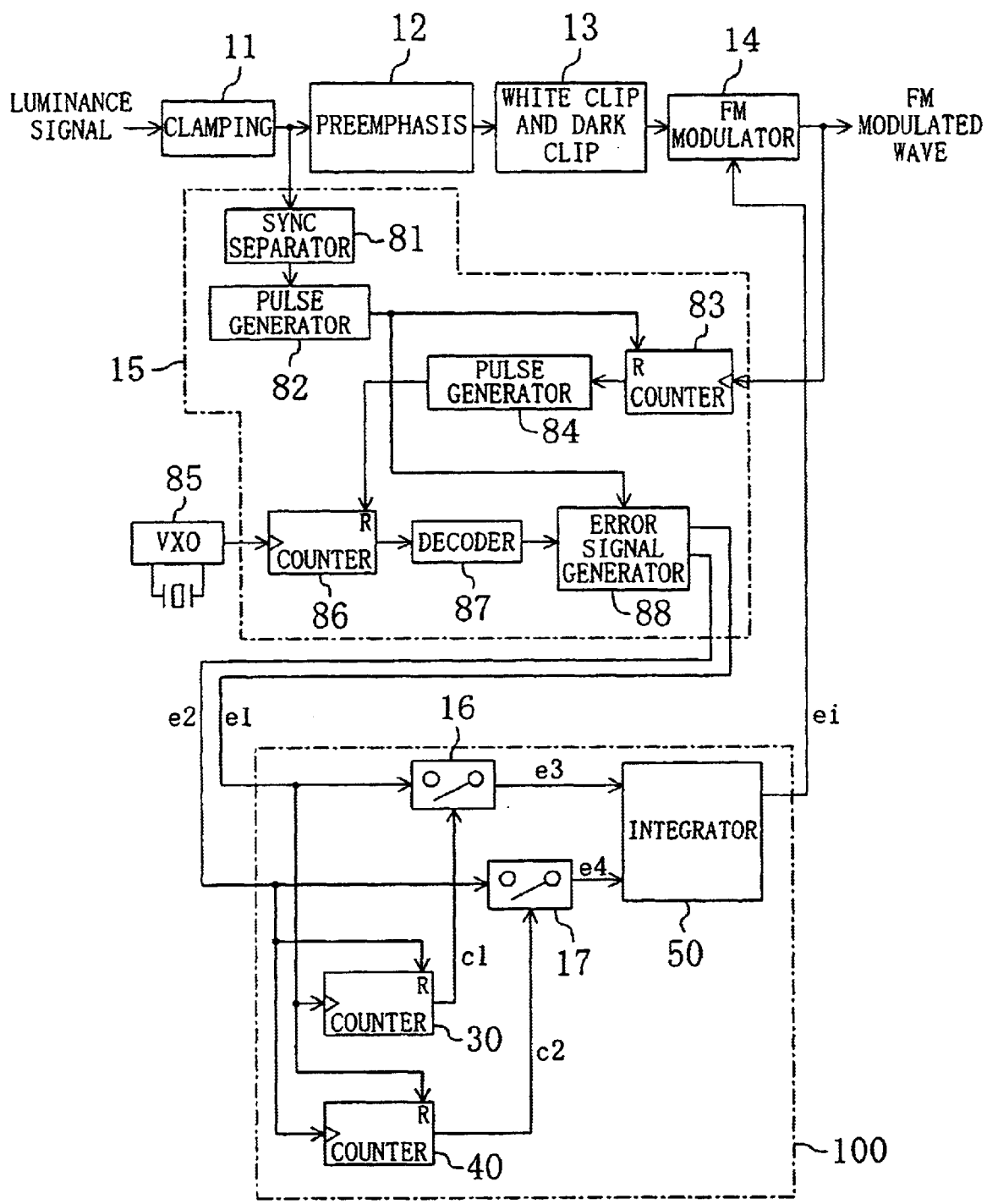
FIG. 6 is a block diagram illustrating a configuration for a video signal processor according to a modified example of the first embodiment.
Figure 13:
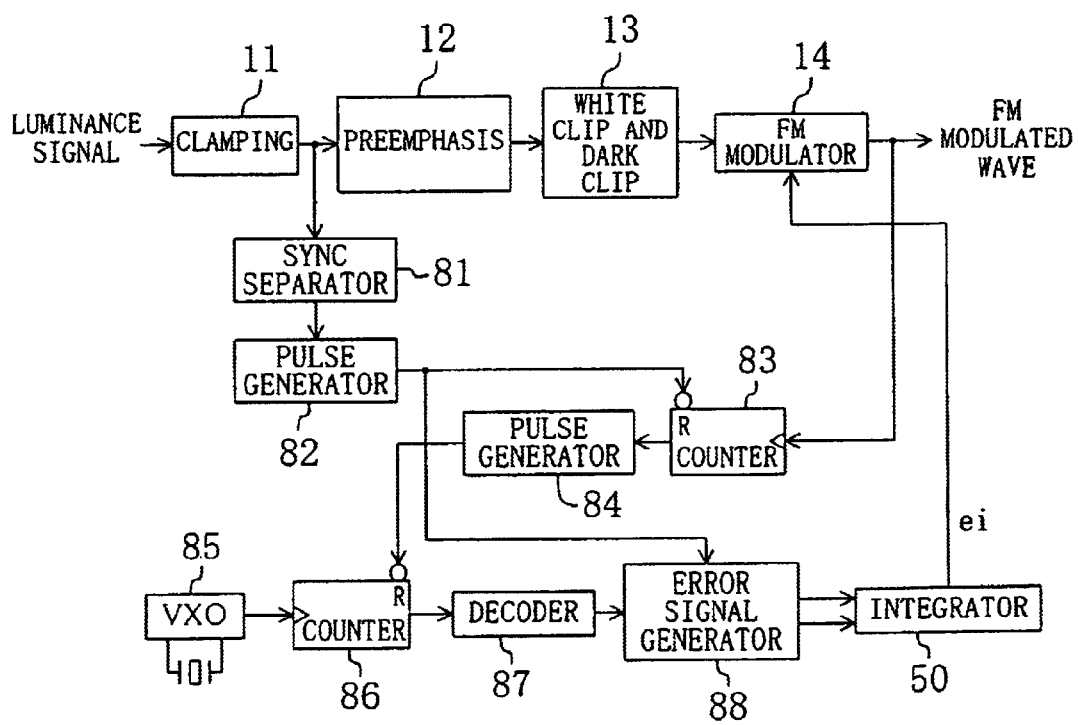
FIG. 13 is a block diagram illustrating a configuration for a known video signal processor.

FIG. 6 illustrates a configuration for a video signal processor according to a modified example of the first embodiment. The video signal processor shown in FIG. 6 is obtained by combining the frequency controller 100 of the processor shown in FIG. 1 with the processor shown in FIG. 13.

As shown in FIG. 6, the processor includes clamping circuit 11, preemphasis circuit 12, white clip and dark clip circuit 13, FM modulator 14, sync separator 81, pulse generators 82 and 84, counters 83 and 86, VXO 85, decoder 87, error signal generator 88, first and second switches 16, 17, first and second counters 30 and 40 and integrator 50.

In this modified example, the sync separator 81, pulse generators 82 and 84, counters 83 and 86, decoder 87 and error signal generator 88 together functions as the frequency discriminator 15. Also, the first and second switches 16 and 17, first and second counters 30 and 40 and integrator 50 together functions as the frequency controller 100.

As in the processor shown in FIG. 1, a luminance signal including a sync signal is input to the clamping circuit 11 and processed by the clamping, preemphasis and white clip and dark clip circuits 11, 12 and 13 and then the FM modulator 14 outputs an FM modulated signal.

On the other hand, the sync separator 81 separates only a sync signal from the luminance signal, which has had its sync tip level clamped by the clamping circuit 11, and then outputs the sync signal to the pulse generator 82. In an interval other than a vertical blanking interval, the pulse generator 82 generates pulses synchronously with horizontal-sync pulses, i.e., each pulse generated starts at the leading edge of a horizontal-sync signal. Also, each pulse generated has a width of 50 µs as measured from the leading edge of the horizontal-sync signal.

The counter 83 receives not only the pulses, generated by the pulse generator 82, as reset pulses, but also the FM modulated signal, output from the FM modulator 14, as clock pulses. And the counter 83 starts counting the number of clock pulses on the leading edge of the horizontal-sync signal. A value "9" is set for the counter 83. That is to say, when the counter 83 is reset and when the count of the counter 83 reaches this value, the counter 83 informs the pulse generator 84 of that. Accordingly, the pulse generator 84 generates pulses with a width nine times longer than the period of the FM modulated signal output from the FM modulator 14.

The VXO 85 outputs a signal, which has a frequency twice higher than a sub-carrier frequency fsc, as a reference frequency signal to the counter 86. The counter 86 receives not only the pulses, generated by the pulse generator 84, as reset pulses, but also the output of the VXO 85 as clock pulses. And the counter 86 counts the number of the input clock pulses and outputs the count to the decoder 87. The decoder 87 compares a predefined value to the output value of the counter 86 and then outputs a signal representing the equality or inequality of these values.

The error signal generator 88 outputs one of the following two types of error signals e1 or e2 in accordance with the output of the decoder 87. Specifically, if the output of the counter 86 is greater than the predefined value of the decoder 87, then the error signal generator 88 outputs the error signal e1, which increases the frequency fo of the FM modulated signal output from the FM modulator 14, to the first switch 16. In addition, the error signal generator 88 also outputs this error signal e1 to the first and second counters 30 and 40 as clock and reset pulses, respectively. Alternatively, if the output of the counter 86 is less than the predefined value of the decoder 87, then the error signal generator 88 outputs the error signal e2, which decreases the frequency fo of the FM modulated signal, to the second switch 17. In addition, the error signal generator 88 also outputs this error signal e2 to the first and second counters 30 and 40 as reset and clock pulses, respectively.

The first and second switches 16 and 17, first and second counters 30 and 40 and integrator 50 operate in the same way as the counterparts of the video signal processor shown in FIG. 1. Thus, these components are identified by the same reference numerals and the description thereof will be omitted herein.

Hereinafter, the relationship between the predefined value of the decoder 87 shown in FIG. 6 and the frequency fo of the FM modulated signal will be described. During a pulse interval with a width nine times longer than the period of the FM modulated signal output from the FM modulator 14, the decoder 87 compares the number of pulses of the reference frequency signal (with the frequency 2fsc) output from the VXO 85 to the predefined value. For example, in recording a Phase Alternating Line (PAL) video signal according to the video home system (VHS) method, a value "21" is set for the decoder 87. In a steady state where the output of the counter 86 is equal to the predefined value for the decoder 87 and there is no need to control the frequency fo of the FM modulated signal, the following equation $$fo/9 = 2fsc/21$$

is met. Since the sub-carrier frequency fsc=4433618.75 Hz in this case, the frequency fo of the FM modulated signal is automatically controlled at:

$$fo = 4433618.75 \times 2 \times 9/21 = 3.800 \text{ MHz}$$

in a horizontal-sync signal interval. In this case, the ratio of the frequency fo of the FM modulated signal to the frequency 2fsc of the reference frequency signal is: fo/2fsc= 9/21.

On the other hand, in recording a National Television stem Committee (NTSC) video signal according to the VHS method, a value "19" is set for the decoder 87. Since the sub-carrier frequency fsc=3579545 Hz in this case, the frequency fo of the FM modulated signal is automatically controlled at:

$$fo = 3579545 \times 2 \times 9/19 = 3.391 \text{ MHz}$$

in a horizontal-sync signal interval.

In this manner, the video signal processor shown in FIG. 6 can also automatically control the frequency of the FM modulated signal output from the FM modulator by lessening the unwanted effects of the noise.

EMBODIMENT 2

Figure 7:
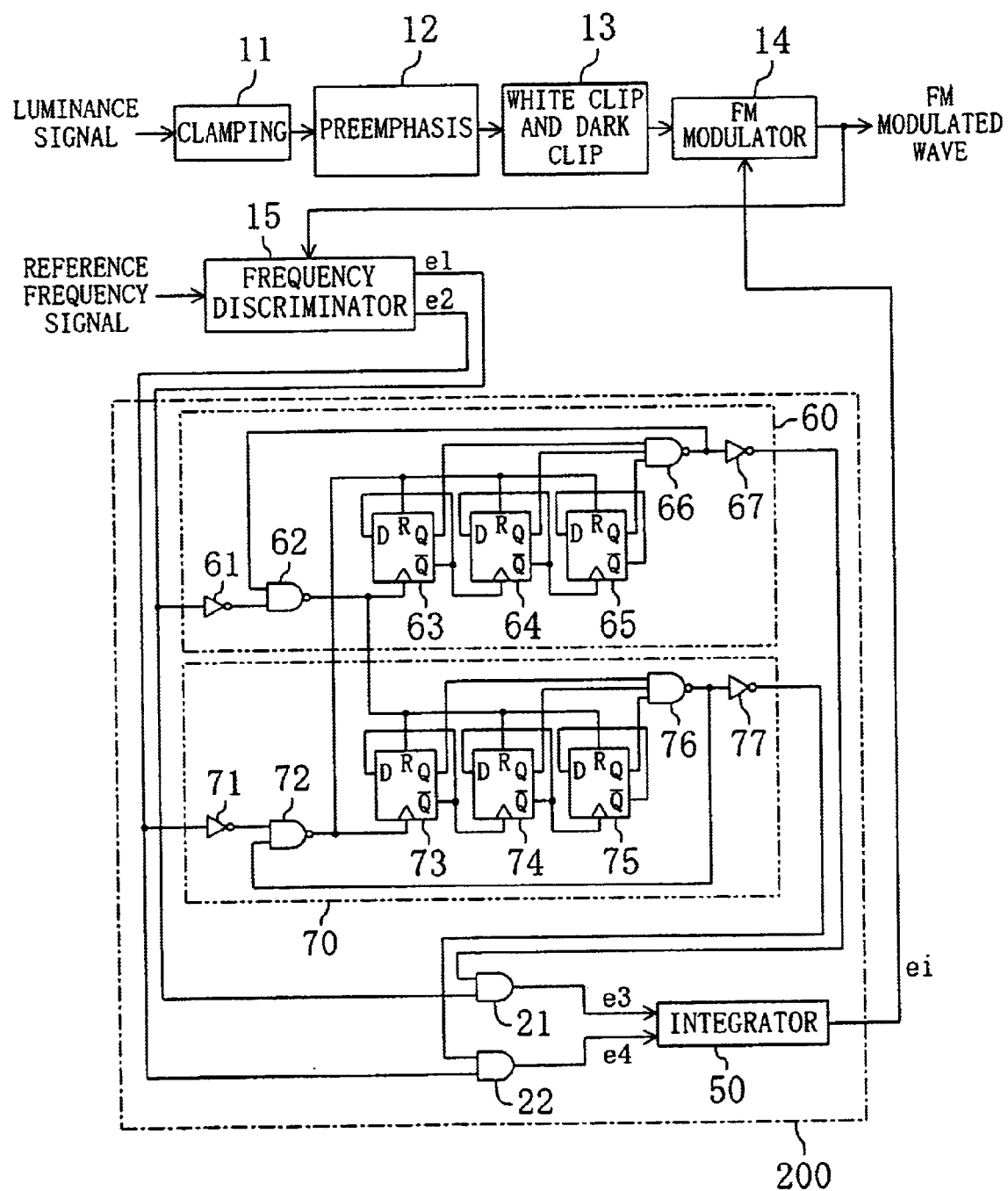
FIG. 7 is a circuit diagram illustrating a configuration for a video signal processor according to a second embodiment of the present invention.

FIG. 7 illustrates a configuration for a video signal processor according to a second embodiment of the present invention. As shown in FIG. 7, the processor includes clamping circuit 11, preemphasis circuit 12, white clip and dark clip circuit 13, FM modulator 14, frequency discriminator 15, first and second AND gates 21 and 22, first and second counters 60 and 70 and integrator 50.

In FIG. 7, the first counter 60 includes inverters 61 and 67, NAND gates 62 and 66 and flip-flops 63, 64 and 65. The second counter 70 also includes inverters 71 and 77, NAND gates 72 and 76 and flip-flops 73, 74 and 75.

In the illustrated embodiment, the first and second AND gates 21 and 22, first and second counters 60 and 70 and integrator 50 together forms a frequency controller 200. The first and second AND gates 21 and 22 serve as first and second switches, respectively. The inverter 61 and NAND gate 62 together operates as a third switch, while the inverter 71 and NAND gate 72 together operates as a fourth switch. The flip-flops 63, 64 and 65 and NAND gate 66 together behaves as a first frequency divider, while the flip-flops 73, 74 and 75 and NAND gate 76 together behaves as a second frequency divider.

As in the processor shown in FIG. 1, a luminance signal including a sync signal is input to the clamping circuit 11 and processed by the clamping, preemphasis and white clip and dark clip circuits 11, 12 and 13 and then the FM modulator 14 outputs an FM modulated signal. The frequency discriminator 15 and integrator 50 also operate in the same way as the counterparts of the processor shown in FIG. 1. Thus, these components are identified by the same reference numerals and the description thereof will be omitted herein.

In the following description, the operations of only the first and second counters 60 and 70 and first and second AND gates 21 and 22 will be explained. In the flip-flops 63, 64, 65, 73, 74 and 75, pulses applied to their reset terminals (R inputs) are asserted at the H level and pulses applied to their clock terminals are asserted on their leading edges.

The frequency discriminator 15 outputs the first error signal e1 to the inverter 61 and to one of the input terminals of the first AND gate 21. The discriminator 15 also outputs the second error signal e2 to the inverter 71 and to one of the input terminals of the second AND gate 22.

The output of the inverter 61 is connected to one of the input terminals of the NAND gate 62. The output of the NAND gate 66 is connected to the other input terminal of the NAND gate 62 and to the input terminal of the inverter 67. The output of the inverter 67 is connected to the other input terminal of the first AND gate 21. The output of the NAND gate 62 is connected to the clock input of the flip-flop 63 and to the reset inputs of the flip-flops 73, 74 and 75.

The NQ output (i.e., the inverse of the Q output) of the flip-flop 63 is connected to the D input of the flip-flop 63 itself and to the clock input of the flip-flop 64. The NQ output of the flip-flop 64 is connected to the D input of the flip-flop 64 itself and to the clock input of the flip-flop 65. And the NQ output of the flip-flop 65 is connected to the D input of the flip-flop 65 itself. The Q outputs of the flip-flops 63, 64 and 65 are connected to the three input terminals of the NAND gate 66, respectively.

In the same manner, the output of the inverter 71 is connected to one of the input terminals of the NAND gate 72. The output of the NAND gate 76 is connected to the other input terminal of the NAND gate 72 and to the input terminal of the inverter 77. The output of the inverter 77 is connected to the other input terminal of the second AND gate 22. The output of the NAND gate 72 is connected to the clock input of the flip-flop 73 and to the reset inputs of the flip-flops 63, 64 and 65.

The NQ output of the flip-flop 73 is connected to the D input of the flip-flop 73 itself and to the clock input of the flip-flop 74. The NQ output of the flip-flop 74 is connected to the D input of the flip-flop 74 itself and to the clock input of the flip-flop 75. And the NQ output of the flip-flop 75 is connected to the D input of the flip-flop 75 itself. The Q outputs of the flip-flops 73, 74 and 75 are connected to the three input terminals of the NAND gate 76, respectively.

Thus, the first frequency divider counts the number of signal pulses input to the clock input of the flip-flop 63.

When the count reaches a preset value of "7", the first frequency divider outputs a first matching signal, i.e., lowers the output of the NAND gate 66 to the L level. In this case, since the output of the NAND gate 62 is fixed, the first frequency divider continuously outputs the first matching signal. On the other hand, on receiving a pulse from the NAND gate 72, the first frequency divider resets its count and stops outputting the first matching signal. That is to say, the first frequency divider raises the output of the NAND gate 66 to the H level. Then, the NAND gate 62 starts passing the first error signal e1 to the first frequency divider, which passes the output of the NAND gate 66 to the first AND gate 21 by way of the inverter 67.

In the same way, the second frequency divider counts the number of signal pulses input to the clock input of the flip-flop 73. When the count reaches a preset value of "7", the second frequency divider outputs a second matching signal, i.e., lowers the output of the NAND gate 76 to the L level. On the other hand, on receiving a pulse from the NAND gate 62, the second frequency divider resets its count and stops outputting the second matching signal. That is to say, the second frequency divider raises the output of the NAND gate 76 to the H level. Then, the second frequency divider passes the output of the NAND gate 76 to the second AND gate 22 by way of the inverter 77.

Accordingly, if only those signal pulses have been input to the clock input of the flip-flop 63 seven times or more after a pulse has been input from the NAND gate 72 to the first frequency divider and before another pulse is input thereto, the first frequency divider outputs the matching signal. Similarly, if only those signal pulses have been input to the clock input of the flip-flop 73 seven times or more after a pulse has been input from the NAND gate 62 to the second frequency divider and before another pulse is input thereto, the second frequency divider outputs the matching signal.

Only when the first frequency divider outputs the matching signal, the first AND gate 21 passes the input error signal e1 and outputs it as an error signal e3 to the integrator 50. In the same manner, only when the second frequency divider outputs the matching signal, the second AND gate 22 passes the input error signal e2 and outputs it as an error signal e4 to the integrator 50.

Hereinafter, it will be described how the processor shown in FIG. 7 operates where the frequency fo of the FM modulated signal, output from the FM modulator 14, is lower than the prescribed frequency and the frequency discriminator 15 outputs the error signal e1 that will increase the frequency fo of the FM modulated signal.

Figure 8:
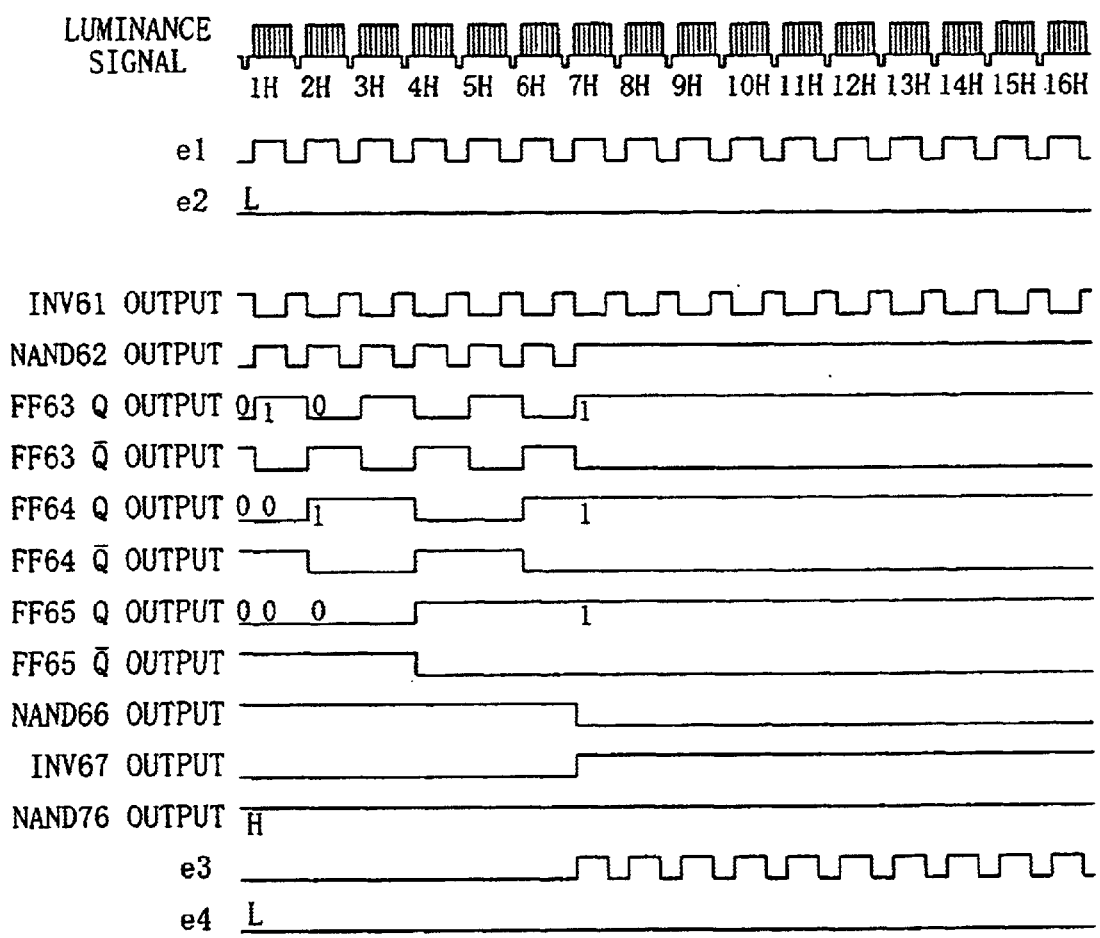
FIG. 8 illustrates signal waveforms at respective parts of the video signal processor shown in FIG. 7 in a situation where the frequency of an FM modulated signal is lower than a prescribed frequency.

FIG. 8 illustrates signal waveforms at respective parts of the video signal processor shown in FIG. 7 in a situation where the frequency fo of an FM modulated signal is lower than the prescribed frequency. The error signal e2 is output from the frequency discriminator 15 to decrease the frequency fo of the FM modulated signal. In FIG. 8, the luminance signal may have any arbitrary waveform for each video signal interval.

In the following description, the Q output of each of the flip-flops 63, 64 and 65 shown in FIG. 7 will be represented as "0" when it is at the L level and as "1" when it is at the H level. And these Q output levels will be arranged in the order of the flip-flops 63, 64 and 65 and represented as a single value. That is to say, this value is a binary number representing the count of the first frequency divider. The Q outputs of the other set of flip-flops 73, 74 and 75 will also be represented by the same notation. The resultant value is a binary number representing the count of the second frequency divider.

Suppose all of the flip-flops 63, 64 and 65 in the first counter 60 have been initialized and the Q outputs thereof are all at the L level. In this case, the Q outputs of the flip-flops 63, 64 and 65 may be represented as "000". Since all of its three inputs are "0", the output of the NAND gate 66 is H. Accordingly, the output of the inverter 67 is L, the error signal e3, which is the output of the first AND gate 21, is fixed at the L level and therefore the error signal e1 is not propagated to the integrator 50. In such a situation, the NAND gate 62 functions as an inverter. Suppose all of the flip-flops 73, 74 and 75 in the second counter 70 have also been initialized.

The error signal e1 is applied to the clock input of the flip-flop 63 by way of the inverter 61 and NAND gate 62. Accordingly, every time the pulse of the error signal e1 rises, the Q output of the flip-flop 63 alternately and repeatedly inverts its level from "H" into "L". The flip-flop 64 receives the NQ output of the flip-flop 63 at its clock input. Thus, every time the Q output of the flip-flop 63 inverts its level from "H", into "L", the Q output of the flip-flop 64 also inverts its level alternately and repeatedly from "H" into "L". The same statement is applicable to the other flip-flop 65.

Accordingly, the Q outputs of the flip-flops 63, 64 and 65 increment their values by one every time the pulse of the error signal e1 rises, i.e., "001", "010", . . . , and "111". On the other hand, the error signal e1 is applied to the reset inputs of the flip-flops 73, 74 and 75 by way of the inverter 61 and NAND gate 62. Thus, the Q outputs of the flip-flops 73, 74 and 75 remain "000".

When the pulses of the error signal e1 have been input seven times and the Q outputs of the flip-flops 63, 64 and 65 become "111" (i.e., when all of the Q outputs reach the H level), the output of the NAND gate 66 falls to the L level. Then, the output of the inverter 67 will rise to the H level and be input to the first AND gate 21. As a result, the error signal e1 is propagated as the error signal e3 to the integrator 50.

In this case, since the output of the NAND gate 66 is L, the output of the NAND gate 62 is fixed at the H level and the clock input of the flip-flop 63 will not change anymore. Accordingly, the Q outputs of the flip-flops 63, 64 and 65 stop changing at "111". In other words, the count of the first frequency divider stops at "7". As a result, the error signal e3 will be continuously propagated to the integrator 50 after that as shown in FIG. 8.

In this manner, the video signal processor shown in FIG. 7 is constructed not to input the error signal to the integrator 50 until the frequency discriminator 15 has output the same error signal seven times consecutively.

Thereafter, the frequency fo of the FM modulated signal output from the FM modulator 14 will increase as the potential level of the integrated error signal ei rises. And when the frequency fo gets equal to the prescribed frequency, the frequency discriminator 15 will stop generating the error signal e1.

The same statement is applicable to a situation where the frequency fo of the FM modulated signal output from the FM modulator 14 is higher than the prescribed frequency and the frequency discriminator 15 is outputting the error signal e2 to decrease the frequency fo of the FM modulated signal.

Next, it will be described how the video signal processor shown in FIG. 7 operates in a situation where the frequency fo of the FM modulated signal output from the FM modulator 14 is equal to the prescribed frequency but noise is superposed on the luminance signal.

Figure 9:
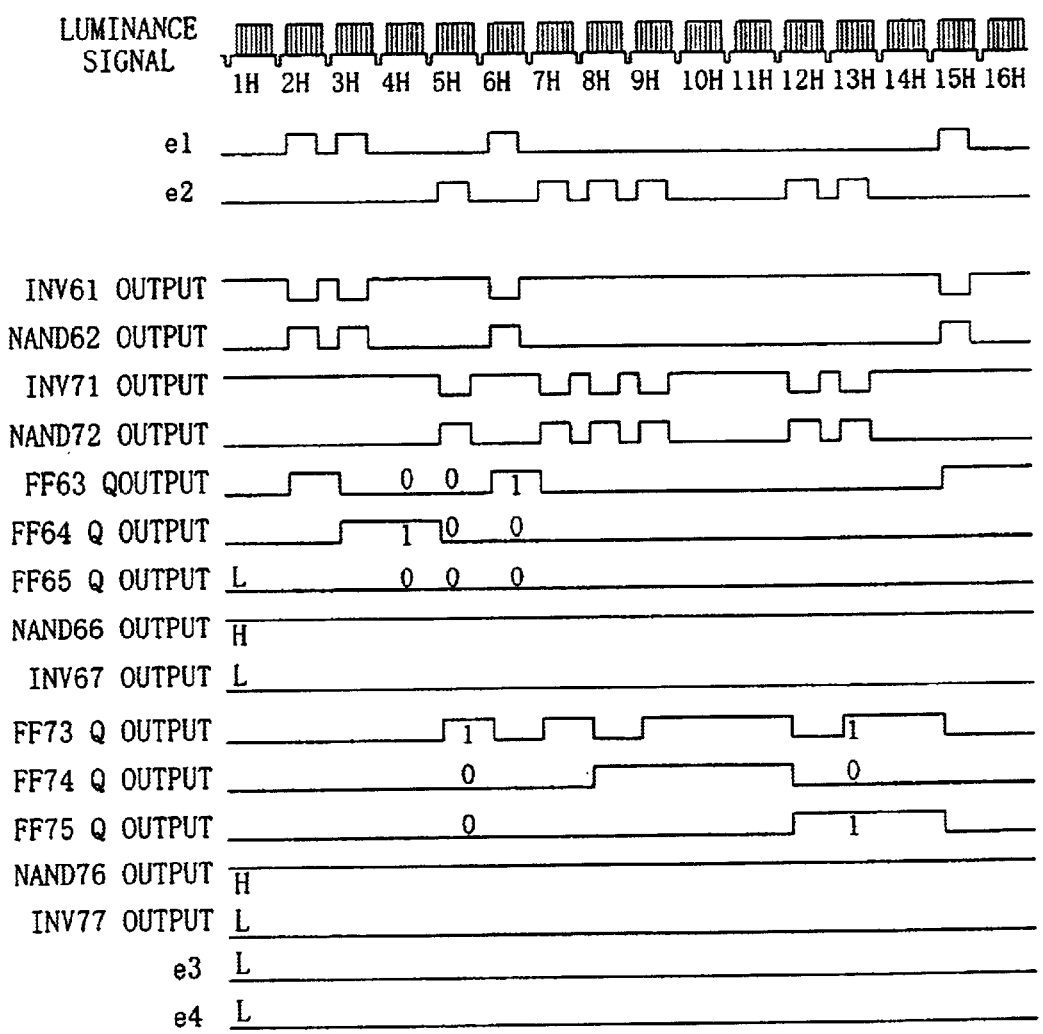
FIG. 9 illustrates signal waveforms at respective parts of the video signal processor shown in FIG. 7 in a situation where noise is superposed on a luminance signal.

FIG. 9 illustrates signal waveforms at respective parts of the video signal processor shown in FIG. 7 in a situation where noise is superposed on the luminance signal. Suppose the frequency fo of the FM modulated signal output from the FM modulator 14 is varying at random due to the superposition of the noise on the luminance signal of the video signal processor shown in FIG. 7 and the frequency discriminator 15 is outputting the error signals e1 and e2 shown in FIG. 9. Also, all of the flip-flops 63, 64, 65, 73, 74 and 75 are supposed to have been initialized.

As shown in FIG. 9, the frequency discriminator 15 outputs the error signal e1 as two pulses in the horizontal scanning intervals 2H and 3H. Thus, the Q outputs of the flip-flops 63, 64 and 65 will be "010". However, since the frequency discriminator 15 outputs the error signal e2 in the horizontal scanning interval 5H, the output of the inverter 71 inverts from "H" into "L" and the output of the NAND gate 72 inverts from "L" into "H". As a result, the flip-flops 63, 64 and 65 are reset and the Q outputs thereof will be "000". Accordingly, even if the frequency discriminator 15 outputs the error signal e1 again in the horizontal scanning interval 6H, the flip-flops 63, 64 and 65 have to start counting from "001", all over gain.

In the same way, the frequency discriminator 15 outputs the error signal e2 as five pulses in total in the horizontal scanning intervals 7H, 8H, 9H, 12H and 13H. Thus, the Q outputs of the flip-flops 73, 74 and 75 will be "101". However, since the frequency discriminator 15 outputs the error signal e1 in the horizontal scanning interval 15H, the output of the inverter 61 inverts from "HI" into "L" and the output of the NAND gate 62 inverts from "L" into "H". As a result, the flip-flops 73, 74 and 75 are reset and the Q outputs thereof will be "000".

Neither the Q outputs of the flip-flops 63, 64 and 65 nor those of the flip-flops 73, 74 and 75 reach "111". Accordingly, the outputs of the NAND gates 66 and 76 remain "H"and the outputs of the inverters 67 and 77 remain "L". And the error signals e3 and e4, i.e., the outputs of the first and second AND gates 21 and 22, respectively, are fixed at the L level. That is to say, the error signals e1 and e2 output from the frequency discriminator 15 are not propagated to the integrator 50. Thus, the potential of the integrated error signal ei does not change and the FM modulator 14 does not control the frequency fo of the FM modulated signal.

In this manner, the error signal is not input to the integrator 50 until the frequency discriminator 50 has output the same error signal a preset number of times consecutively. Thus, it is possible to suppress the variation of the frequency fo of the FM modulated signal due to the noise superposed on the luminance signal during a horizontal-sync signal interval.

In the foregoing embodiment, the preset number of times is supposed to be seven. Alternatively, to adopt a different number of times, the first and second frequency dividers of the first and second counters 60 and 70 may be modified by changing the number of flip-flops included, for example.

EMBODIMENT 3

Figure 10:
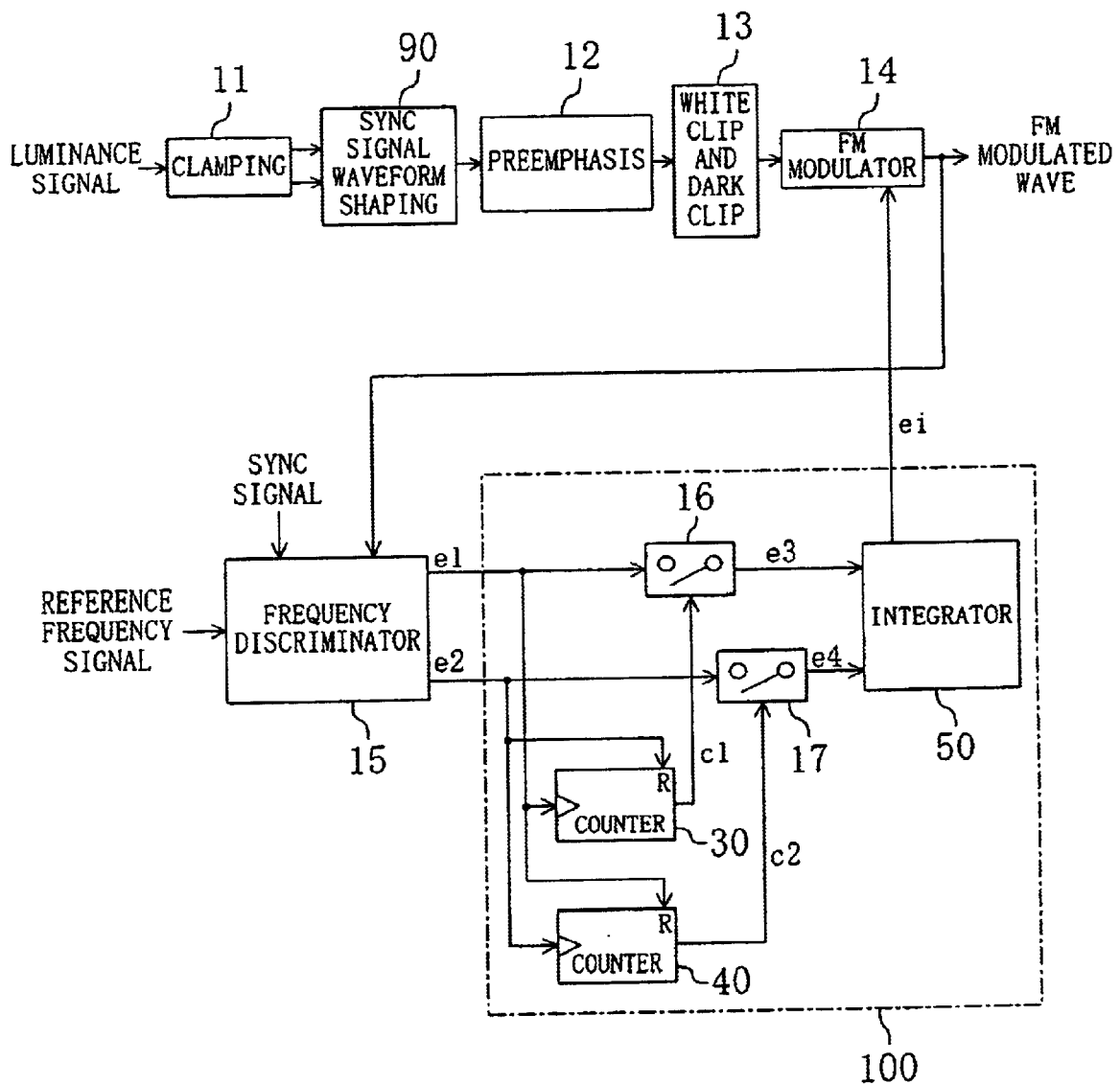
FIG. 10 is a block diagram illustrating a configuration for a video signal processor according to a third embodiment of the present invention.

FIG. 10 illustrates a configuration for a video signal processor according to a third embodiment of the present invention. As shown in FIG. 10, the processor includes clamping circuit 11, sync signal waveform shaping circuit 90, preemphasis circuit 12, white clip and dark clip circuit 13, FM modulator 14, frequency discriminator 15 and frequency controller 100.

The video signal processor shown in FIG. 10 includes not only all the components of the processor shown in FIG. 1 but also the sync signal waveform shaping circuit 90 for shaping the waveform of the sync signal. In FIG. 10, all the components but the sync signal waveform shaping circuit 90 are the same as the counterparts of the processor shown in FIG. 1. Thus, those components are identified by the same reference numerals and the description thereof will be omitted herein.

Figure 11:
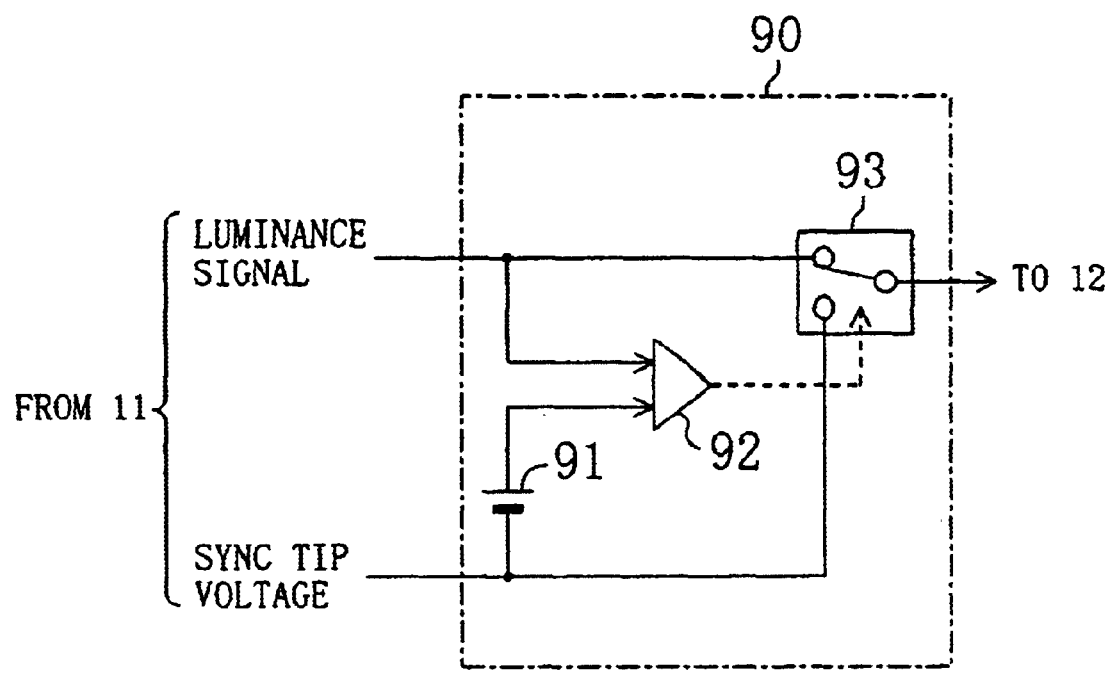
FIG. 11 is a circuit diagram illustrating the sync signal waveform shaping circuit shown in FIG. 10.

FIG. 11 illustrates the sync signal waveform shaping circuit 90 shown in FIG. 10. As shown in FIG. 11, the waveform shaping circuit 90 includes voltage shifter 91, voltage comparator 92 and switch 93.

The clamping circuit 11 outputs the luminance signal and a sync tip voltage to the sync signal waveform shaping circuit 90. The sync tip voltage has been used by the clamping circuit 11 to clamp the sync tip level of the luminance signal. Specifically, the luminance signal is input to the voltage comparator 92 and switch 93, while the sync tip voltage is input to the voltage shifter 91 and switch 93. The voltage shifter 91 adds a predetermined voltage to the sync tip voltage and then outputs the sum as a threshold voltage to the voltage comparator 92.

In a horizontal-sync signal interval, the voltage comparator 92 compares the signal level of the luminance signal to the threshold voltage and controls the switch 93 in accordance with the comparison result. Specifically, if the signal level of the luminance signal is higher than the threshold voltage, the switch 93 is controlled in such a manner as to selectively output the luminance signal. Alternatively, if the signal level of the luminance signal is lower than the threshold voltage, the switch 93 is controlled in such a manner as to selectively output the sync tip voltage. In any case, the switch 93 outputs the signal selected to the pre-emphasis circuit 12.

Figure 12A:
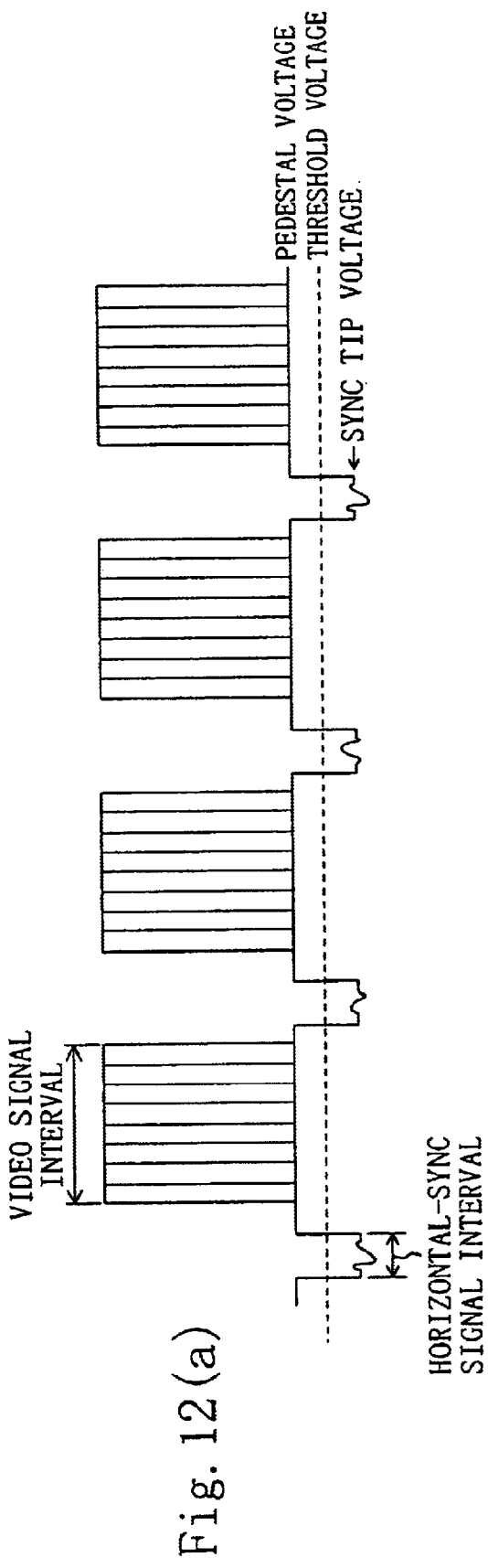
FIGS. 12(a) and 12(b) illustrate a luminance signal before and after the waveform of the signal has been shaped by the sync signal waveform shaping circuit.
Figure 12B:
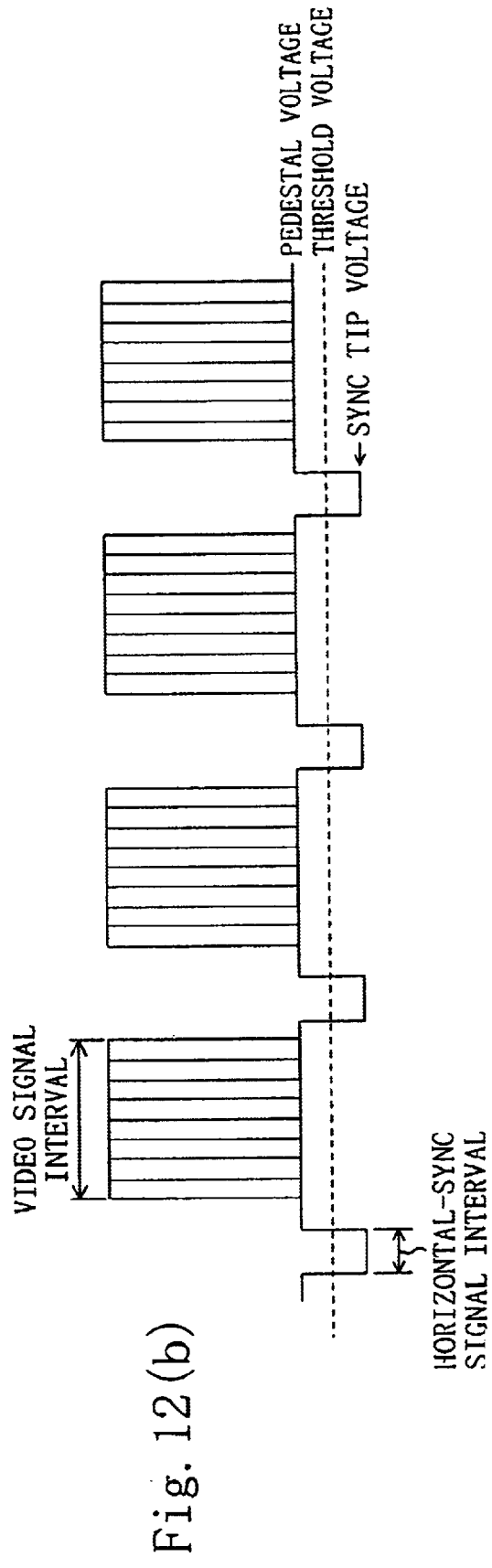

FIGS. 12(a) and 12(b) illustrate a luminance signal before and after the waveform of the signal has been shaped by the sync signal waveform shaping circuit 90. Specifically, FIG. 12(a) illustrates a luminance signal that has not yet been input to the sync signal waveform shaping circuit 90 and has not had its waveform shaped yet, either. As described above, the threshold voltage is a sum of the sync tip voltage and the predetermined voltage added by the voltage shifter 91. FIG. 12(b) illustrates a luminance signal that has had its waveform shaped.

If the signal level of the luminance signal is higher than the threshold voltage, then it seems that the signal in question is not a horizontal-sync signal. Thus, the sync signal waveform shaping circuit 90 outputs the input luminance signal as it is. On the other hand, if the signal level of the luminance signal is lower than the threshold voltage, then it seems that the signal is a horizontal-sync signal. In that case, the sync signal waveform shaping circuit 90 outputs a constant sync tip voltage, not the input luminance signal. Accordingly, all the components of noise superposed on the horizontal-sync signal are removable so long as the levels of those components do not exceed the threshold voltage. This threshold voltage may be defined at an arbitrary level between the sync tip level and a pedestal level.

As can be seen, the video signal processor shown in FIG. 10 is not affected anymore by the noise that has been superposed on the horizontal-sync signal so long as the level of the noise does not exceed the threshold voltage. Also, even if the noise superposed on the horizontal-sync signal does have a level exceeding the threshold voltage, the processor is not affected by the noise, either, unless the same error signal e1 or e2 is output a preset number of times or more on end due to the noise. It should be noted that the preset number of times is equal to the preset value for the first or second counter 30 or 40.

A video signal processor according to the third embodiment has been illustrated as further including the sync signal waveform shaping circuit 90 in addition to all the components of the processor shown in FIG. 1. Optionally, the sync signal waveform shaping circuit 90 may also be provided for the video signal processor shown in FIG. 7.

As another alternative, the frequency controller 100 of the video signal processor shown in FIG. 10 is replaceable with just the integrator 50 shown in FIG. 1. In that case, even if the frequency discriminator 15 directly outputs the error signal e1 or e2 to the integrator 50, the frequency of the FM modulated signal is still controllable without being affected by any noise at a level equal to lower than the threshold voltage.

In the foregoing embodiments, each of the first and second error signals e1 and e2 is supposed to be a pulse signal that rises to the H level once a horizontal-sync signal interval. However, the error signal does not have to be a pulse signal like this, but may be any other signal so long as the output of the error signal is discernable. For example, the error signal may be a pulse signal that rises to the H level a number n (where n is an integer equal to or greater than two) times a horizontal-sync signal interval.

Also, in the foregoing embodiments, a ratio of the frequency of the FM modulated signal during a horizontal-sync signal interval to the prescribed frequency is compared to a predetermined ratio. Alternatively, a frequency ratio during a vertical-sync signal interval may be compared to a predetermined ratio. In that case, the frequency discriminator outputs the first or second error signal every vertical-sync signal interval.

Furthermore, the sync signal may be any other signal synchronized with a horizontal- or vertical-sync signal, e.g., a burst gate pulse.

As described above, the inventive video signal processor can automatically control the frequency of an FM modulated signal and reduce the deterioration of image quality due to the superposition of noise on a sync signal, included in a luminance signal, without sacrificing the responsiveness of the frequency control.

What is claimed is:

1. A video signal processor comprising:

a frequency modulator for outputting a frequency-modulated signal of a luminance signal input thereto;

a frequency discriminator, which receives a reference frequency signal and the frequency-modulated signal and outputs a first or second error signal every horizontal or vertical scanning interval, the discriminator outputting the first error signal if a ratio of a frequency of the frequency-modulated signal during a horizontal- or vertical-sync signal interval to a frequency of the reference frequency signal is smaller than a predetermined ratio, the discriminator outputting the second error signal if the ratio is greater than the predetermined ratio; and a frequency controller for outputting, responsive to the first and second error signals, a control signal to the frequency modulator, wherein if the first error signal has been input to the controller a preset number of times or more during an interval before the second error signal is input thereto, the controller instructs the modulator to increase the frequency of the frequency-modulated signal, and wherein if the second error signal has been input to the controller a preset number of times or more during an interval before the first error signal is input thereto, the controller instructs the modulator to decrease the frequency of the frequency-modulated signal.

2. The processor of claim 1, wherein the frequency controller comprises:
   a first counter for receiving the first and second error signals at its clock and reset terminals, respectively, and counting the number of times the first error signal has been input thereto, the first counter outputting a first matching signal when the counted number reaches a first preset number of times;
   a second counter for receiving the first and second error signals at its reset and clock terminals, respectively, and counting the number of times the second error signal has been input thereto, the second counter outputting a second matching signal when the counted number reaches a second preset number of times;
   a first switch for passing the first error signal while the first counter is outputting the first matching signal;
   a second switch for passing the second error signal while the second counter is outputting the second matching signal; and
   an integrator for receiving and integrating the first and second error signals, which have been passed through the first and second switches, respectively, as two inputs of mutually opposite polarities, thereby outputting a result of the integration,
   wherein the frequency controller provides the output of the integrator as the control signal to the frequency modulator.

3. The processor of claim 1, wherein the first and second error signals are supplied as pulses, and
   wherein the frequency controller comprises:
   a first frequency divider for counting the number of times a signal has been input thereto as the pulses and outputting a first matching signal when the counted number reaches a first preset number of times;
   a second frequency divider for counting the number of times a signal has been input thereto as the pulses and outputting a second matching signal when the counted number reaches a second preset number of times;
   a first switch for passing the first error signal while the first frequency divider is outputting the first matching signal;
   a second switch for passing the second error signal while the second frequency divider is outputting the second matching signal;
   an integrator for receiving and integrating the first and second error signals, which have been passed through the first and second switches, respectively, as two inputs of mutually opposite polarities, thereby outputting a result of the integration;
   a third switch for passing the first error signal to the first and second frequency dividers as the input and reset signals, respectively, while the first frequency divider is not outputting the first matching signal; and
   a fourth switch for passing the second error signal to the first and second frequency dividers as the reset and input signals, respectively, while the second frequency divider is not outputting the second matching signal, wherein the frequency controller provides the output of the integrator as the control signal to the frequency modulator.

4. The processor of claim 1, 2 or 3, further comprising a sync signal waveform shaping circuit for making a signal level of a component of the luminance signal, which is equal to or lower than a threshold value, constant and outputting a waveform-shaped version of the luminance signal, and
   wherein the frequency modulator outputs a frequency-modulated signal of the waveform-shaped luminance signal input thereto.

5. A video signal processor comprising:
   a sync signal waveform shaping circuit for making a signal level of a component of a luminance signal, which is equal to or lower than a threshold value, constant and outputting a waveform-shaped version of the luminance signal;
   a frequency modulator for outputting a frequency-modulated signal of the waveform-shaped luminance signal input thereto;
   a frequency discriminator, which receives a reference frequency signal and the frequency-modulated signal and outputs a first or second error signal every horizontal or vertical scanning interval, the discriminator outputting the first error signal if a ratio of a frequency of the frequency-modulated signal during a horizontal- or vertical-sync signal interval to a frequency of the reference frequency signal is smaller than a predetermined ratio, the discriminator outputting the second error signal if the ratio is greater than the predetermined ratio; and
   a frequency controller for outputting a control signal to the frequency modulator responsive to the first and second error signals.

\* \* \* \* \*